United States Patent
Larner et al.

(10) Patent No.: US 11,585,670 B2
(45) Date of Patent: Feb. 21, 2023

(54) METHOD AND SYSTEM FOR DETERMINING AND DYNAMICALLY UPDATING A ROUTE AND DRIVING STYLE FOR PASSENGER COMFORT

(71) Applicant: Waymo LLC, Mountain View, CA (US)

(72) Inventors: Daniel Lynn Larner, San Jose, CA (US); Jared Stephen Russell, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 189 days.

(21) Appl. No.: 17/173,274

(22) Filed: Feb. 11, 2021

(65) Prior Publication Data

US 2021/0164796 A1    Jun. 3, 2021

Related U.S. Application Data

(63) Continuation of application No. 16/111,581, filed on Aug. 24, 2018, now Pat. No. 10,942,037, which is a
(Continued)

(51) Int. Cl.
*G01C 21/34* (2006.01)
*B60W 40/08* (2012.01)
(Continued)

(52) U.S. Cl.
CPC ....... *G01C 21/3484* (2013.01); *B60W 30/025* (2013.01); *B60W 40/08* (2013.01);
(Continued)

(58) Field of Classification Search
None
See application file for complete search history.

(56) References Cited

U.S. PATENT DOCUMENTS 7,437,219 B2   10/2008   Bos
8,306,732 B2   11/2012   Hoffmann
(Continued)

FOREIGN PATENT DOCUMENTS

CN   104554095 A   4/2015
CN   105229422 A   1/2016
(Continued)

OTHER PUBLICATIONS

European Patent Office Extended European Search Report for Application No. 20214611.4 dated Apr. 6, 2021.
(Continued)

*Primary Examiner* — Todd Melton
(74) *Attorney, Agent, or Firm* — Botos Churchill IP Law

(57) ABSTRACT

The disclosure provides for a method for determining a route for passenger comfort and operating a vehicle according to the determined route. To start, a set of routes from a start location to an end location may be determined. Each route includes one or more portions. For each route of the set of routes, a total motion sickness value is determined based on a sway motion sickness value, a surge motion sickness value, and a heave motion sickness value for each of the given portions. The total motion sickness value for a route reflects a likelihood that a user will experience motion sickness while in a vehicle along the route. A route may then be selected from the set of routes based on the total motion sickness value of each route of the set of routes, and the vehicle may be maneuvered according to the selected route.

20 Claims, 11 Drawing Sheets

Related U.S. Application Data continuation of application No. 15/286,153, filed on Oct. 5, 2016, now Pat. No. 10,107,635.

(60) Provisional application No. 62/377,200, filed on Aug. 19, 2016.

(51) Int. Cl.
  *B60W 30/02* (2012.01)
  *G05D 1/00* (2006.01)
  *G05D 1/02* (2020.01)

(52) U.S. Cl.
  CPC ....... *G01C 21/3453* (2013.01); *G05D 1/0088* (2013.01); *G05D 1/0212* (2013.01); *G01C 21/3461* (2013.01)

(56) References Cited

U.S. PATENT DOCUMENTS

| | | |
|---|---|---|
| 9,145,129 B2 | 9/2015 | Worrel et al. |
| 9,244,462 B2 | 1/2016 | Pedersen |
| 9,605,970 B1 | 3/2017 | Day et al. |
| 9,868,332 B2 | 1/2018 | Anderson et al. |
| 2011/0046877 A1 | 2/2011 | Hoffmann |
| 2011/0130956 A1 | 6/2011 | Tracton et al. |
| 2013/0090823 A1 | 4/2013 | Hoffmann |
| 2013/0211656 A1 | 8/2013 | An |
| 2015/0120149 A1 | 4/2015 | Worrel et al. |
| 2017/0267253 A1* | 9/2017 | Schmidt ................ B60W 50/14 |

FOREIGN PATENT DOCUMENTS

| | | |
|---|---|---|
| DE | 102012016736 A1 | 5/2014 |
| EP | 3500902 B1 | 1/2021 |
| JP | S60-151195 A | 8/1985 |
| JP | 2005326962 A | 11/2005 |
| JP | 2006027347 A | 2/2006 |
| JP | 2007236644 A | 9/2007 |
| JP | 2008260315 A | 10/2008 |
| JP | 2012059274 A | 3/2012 |
| JP | 2015141099 A | 8/2015 |
| JP | 2017020859 A | 1/2017 |
| JP | 2017071369 A | 4/2017 |
| KR | 20130091907 A | 8/2013 |
| KR | 20140103613 A | 8/2014 |
| WO | 2014139821 A1 | 9/2014 |

OTHER PUBLICATIONS

Japanese Office Action for Application No. 2020-039577 dated Apr. 15, 2021.
Republic of Korea's Notice of Preliminary Rejection for Application No. 10-2019-7032348 dated Feb. 22, 2021.
Japanese Decision to Grant for Application No. 2019-503430 dated Feb. 10, 2020. (No English translation).
Second Chinese Office Action for Application No. 201780050679.7 dated Feb. 3, 2020.
Extended European Search Report received for Application No. 17842115.2 dated Sep. 3, 2019, 11 pages.
First Chinese Office Action received for Application No. 201780050679.7 dated Sep. 12, 2019, 15 pages (9 pages of English Translation and 6 pages of Official copy).
International Search Report and Written Opinion for International Application No. PCT/US2017/047335, dated Nov. 23, 2017, 13 pages.
Notice of Preliminary Rejection (Non-Final) for Korean Patent Application No. 10-2019-7006218 dated Jun. 20, 2019, 10 pages (5 pages of English Translation and 5 pages of Official copy).
Office Action received for Australian Application No. 2017313818 dated May 6, 2019, 2 pages.
Office Action received for Australian Application No. 2017313818 dated Nov. 13, 2019, 3 pages.
Office Action received for Japanese Application No. 2019503430 dated Aug. 13, 2019, 6 pages (3 pages of English Translation and 3 pages of Official copy).
Bos , et al., "User Interface Considerations to Prevent Self-Driving Carsickness", AutomotiveUI '15 Adjunct, Nottingham, United Kingdom, Sep. 1-3, 2015, pp. 14-19.
Elbanhawi , et al., "In the Passenger Seat; investigating Ride Comfort Measures in Autonomous Cars", IEEE Intelligent Transportation Systems Magazine, Jul. 2015, 14 pages.
IBM , "Navigation System Route Optimization for 1-15 Passengers that Suffer from Travel Sickness", ip.com Journal, XP013130274, ISSN: 1533-0001, Mar. 12, 2009, 4 pages.
Wikipedia , "Ship Motions", Retrieved from Internet <http://en.wikipedia.org/wiki/Ship motions, on Aug. 3, 2016, 2 pages.
Examination Report for Australian Patent Application No. 2021202449, dated Dec. 17, 2021.

* cited by examiner

500

600

METHOD AND SYSTEM FOR DETERMINING AND DYNAMICALLY UPDATING A ROUTE AND DRIVING STYLE FOR PASSENGER COMFORT

CROSS-REFERENCE TO RELATED APPLICATIONS

The present application is a continuation of U.S. patent application Ser. No. 16/111,581, filed on Aug. 24, 2018, which is a continuation of U.S. patent application Ser. No. 15/286,153, filed on Oct. 5, 2016, which claims the benefit of the filing date of U.S. Provisional Patent Application No. 62/377,200, filed Aug. 19, 2016, the disclosures of which are hereby incorporated herein by reference.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pick up or destination location, and a vehicle maneuvers itself to that location.

Some passengers may suffer from motion sickness while in a vehicle. As an example, symptoms of motion sickness may include nausea, headache, and upset stomach. Therefore, a passenger with motion sickness may experience a level of discomfort, which can make a trip in a vehicle unpleasant for that passenger as well as any other passengers in the vehicle.

BRIEF SUMMARY

Aspects of the disclosure provide for a method that includes determining, by one or more processors, a set of routes from a start location to an end location, each route of the set of routes comprising one or more portions; for each given route of the set of routes, determining, by the one or more processors, a total motion sickness value based on a sway motion sickness value, a surge motion sickness value, and a heave motion sickness value for each of the one or more portions of the given route, wherein the total motion sickness value for a route reflects a likelihood that a user will experience motion sickness while in a vehicle along the route; selecting, by the one or more processors, a first route of the set of routes based on the total motion sickness value of each route of the set of routes; and maneuvering, by the one or more processors, the vehicle according to the first route.

In one example, the method also includes receiving, by the one or more processors, user input indicating a user is experiencing symptoms of motion sickness while the vehicle is operating using a first driving style; and operating, by the one or more processors, the vehicle using a second driving style, the second driving style being less assertive than the first driving style. In another example, the first route of the set of routes is selected based on the total motion sickness value of each route of the set of routes by comparing each total motion sickness value to a threshold value. In yet another example, the set of routes are displayed with an indication of at least one respective total motion sickness value.

In a further example, the method also includes determining, by the one or more processors, a plurality of total motion sickness values for a given route of the set of routes, each total motion sickness value for the given route being for a given driving style of a plurality of driving styles. In this example, selecting the first route of the set of routes includes selecting a first driving style, and a combination of the first route and the first driving style are selected when a total motion sickness value determined for the combination is below a threshold value and an estimated arrival time for the combination is earlier than any other combination of routes and driving styles.

In another example, the method also includes, for each portion of the one or more portions of the given route, determining the sway motion sickness value, the surge motion sickness value, and the heave motion sickness value for a given portion based on a given driving style. The total motion sickness value for each portion, in this example, is a weighted combination of at least the sway motion sickness value, the surge motion sickness value, and the heave motion sickness value. In a further example, the method also includes determining a roll motion sickness value, a yaw motion sickness value, and a pitch motion sickness value for the given portion based on a given driving style. The total motion sickness value for each of the given portions, in this example, is also based on the roll motion sickness value, the yaw motion sickness value, and the pitch motion sickness value.

In yet another example, the method also includes receiving, by the one or more processors, user input related to a level of comfort on a trip; and determining, by the one or more processors, a threshold value using at least the user input. The first route is selected in this example based on the threshold value. In another example, the total motion sickness value for each given route is also based on a location of a seat in the vehicle.

Other aspects of the disclosure provide for a system that includes a memory storing instructions for operating a vehicle autonomously and one or more processors. The one or more processors are configured to determine a set of routes from a start location to an end location, each route of the set of routes comprising one or more portions; for each given route of the set of routes, determine a total motion sickness value based on a sway motion sickness value, a surge motion sickness value, and a heave motion sickness value for each of the one or more portions of the given route, wherein the total motion sickness value for a route reflects a likelihood that a user will experience motion sickness while in the vehicle along the route; select a first route of the set of routes based on the total motion sickness value of each route of the set of routes; and maneuver the vehicle according to the first route.

In one example, the one or more processors are also configured to receive user input indicating a user is experiencing symptoms of motion sickness while the vehicle is operating using a first driving style and operate the vehicle using a second driving style, the second driving style being less assertive than the first driving style. In another example, the first route of the set of routes is selected based on the total motion sickness value of each route of the set of routes by comparing each total motion sickness value to a threshold value. In yet another example, the set of routes are displayed with an indication of at least one respective total motion sickness value.

In a further example, the one or more processors are also configured to determine a plurality of total motion sickness values for a given route of the set of routes, each total motion sickness value for the given route being for a given driving style of a plurality of driving styles. In this example, selecting the first route of the set of routes includes selecting a first driving style, and a combination of the first route and the first driving style are selected when a total motion sickness value determined for the combination is below a threshold value and an estimated arrival time for the combination is earlier than any other combination of routes and driving styles.

In another example, the one or more processors are also configured to, for each portion of the one or more portions of the given route, determine the sway motion sickness value, the surge motion sickness value, and the heave motion sickness value for a given portion based on a given driving style. The total motion sickness value for each portion, in this example, is a weighted combination of at least the sway motion sickness value, the surge motion sickness value, and the heave motion sickness value. In a further example, the system also includes the vehicle.

Further aspects of the disclosure provide for a non-transitory, tangible computer-readable storage medium on which computer readable instructions of a program are stored. The computer readable instructions, when executed by one or more processors, cause the one or more processors to perform a method. The method includes determining a set of routes from a start location to an end location, each route of the set of routes comprising one or more portions; for each given route of the set of routes, determining a total motion sickness value based on a sway motion sickness value, a surge motion sickness value, and the a heave motion sickness value for each of the one or more portions of the given route, wherein the total motion sickness value for a route reflects a likelihood that a user will experience motion sickness while in a vehicle along the route; selecting a first route of the set of routes based on the total motion sickness value of each route of the set of routes; and maneuvering the vehicle according to the first route.

In one example, the method also includes receiving user input indicating a user is experiencing symptoms of motion sickness while the vehicle is operating using a first driving style and operating the vehicle using a second driving style, the second driving style being less assertive than the first driving style.

DETAILED DESCRIPTION

Overview

Figure 1:
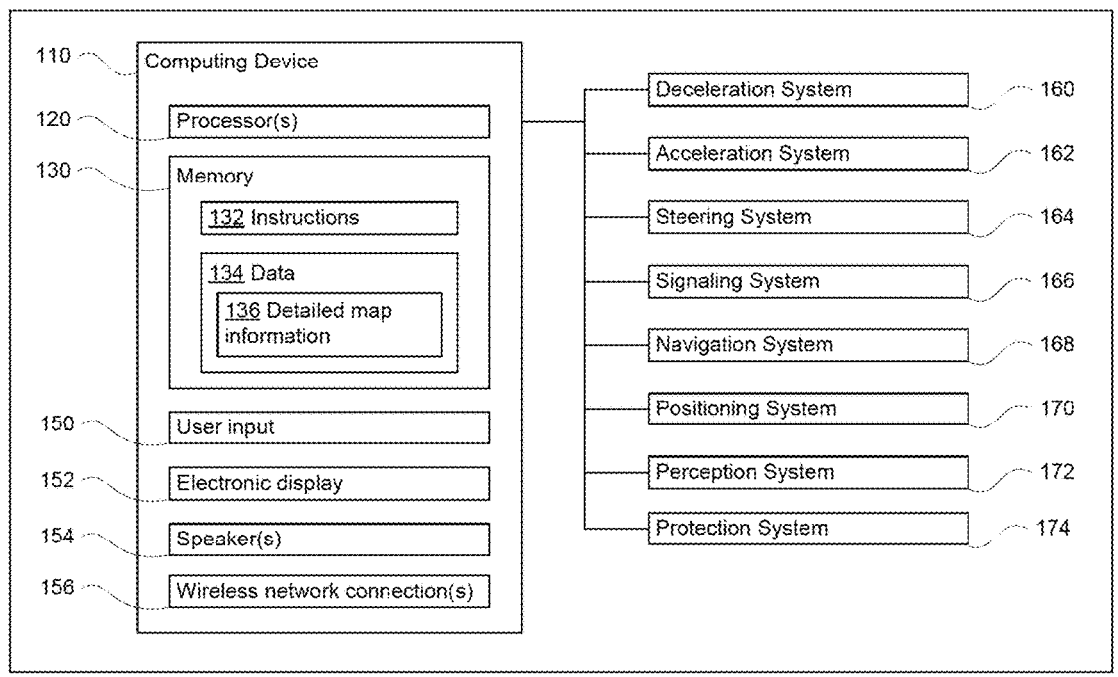
FIG. 1 is a functional diagram of an example vehicle in accordance with aspects of the disclosure.
Figure 2A:
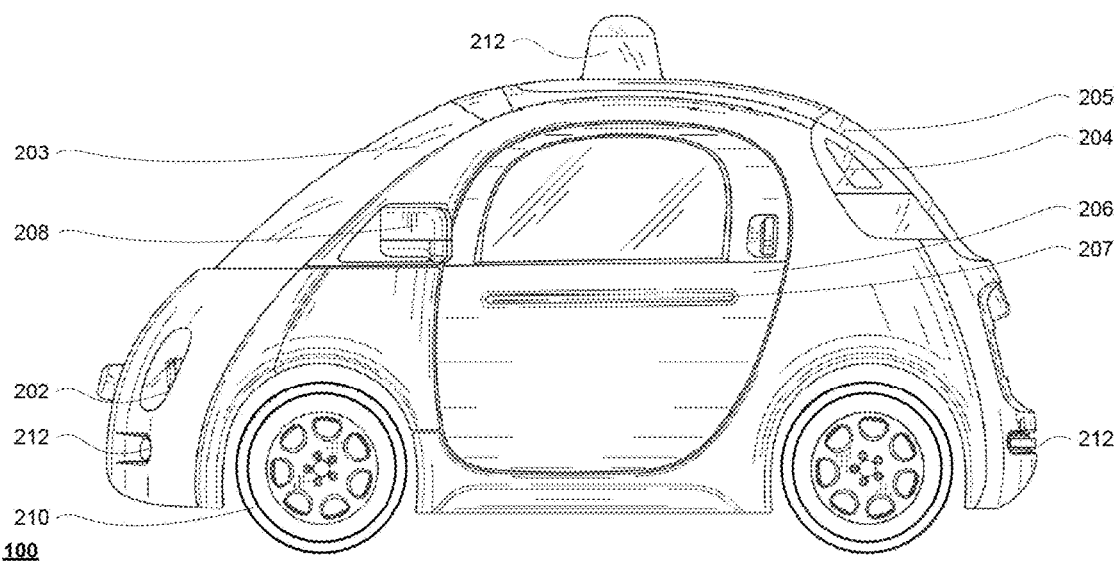
FIGS. 2A-2D are example external views of a vehicle in accordance with aspects of the disclosure.
Figure 2B:
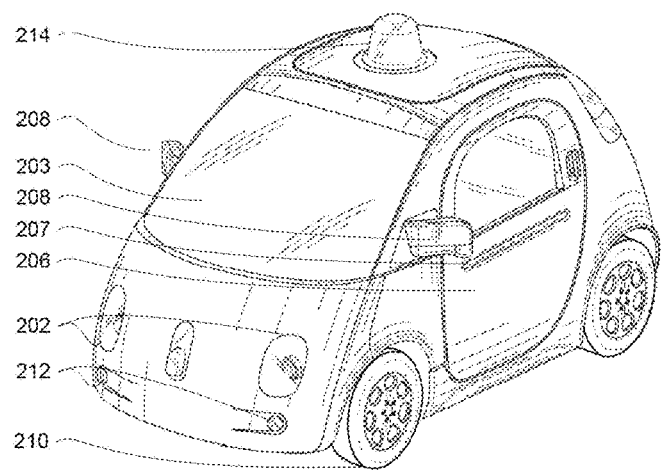
Figure 2C:
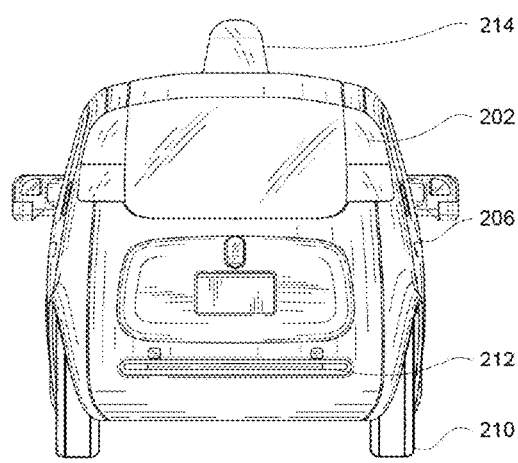
Figure 2D:
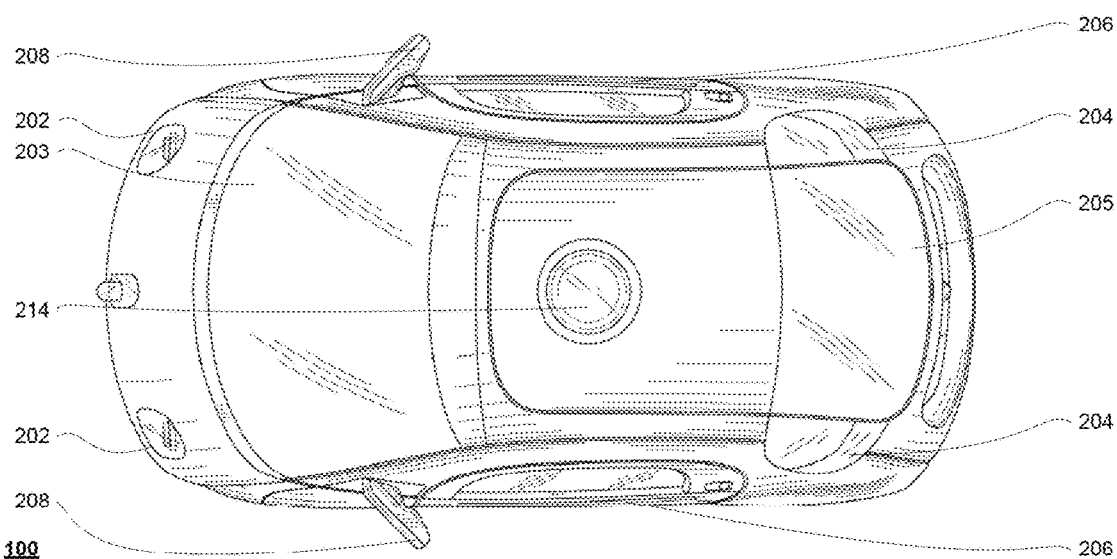

The technology relates to determining a route and driving style for a vehicle in order to reduce the likelihood of a passenger experiencing motion sickness during a trip. For instance, certain roadways may have more changes in direction and therefore more acceleration. In addition, certain driving styles subject a passenger to different amounts and types of acceleration. Because a passenger may experience motion sickness due to a variety of types and amounts of accelerations, some routes may be more comfortable than others for the passenger. Accordingly, acceleration for a given route may be used to determine a total motion sickness value for a given driving style, and the motion sickness value may be used in route planning and/or operation of autonomous vehicles.

To determine motion sickness values for a trip and use these values to plan or select a route for the trip, one or more routes from a start location to an end location may be determined. The start location may be a detected current location of a user device or may be selected based on user input received from the user device. The end location may be selected based on user input received from the user device. Each route of the set of routes may comprise one or more portions.

Each portion of each route of the set of routes may be assigned a motion sickness value by combining a sway motion sickness value, a surge motion sickness value, and a heave motion sickness value of each portion of the route for each driving style in a plurality of driving styles. The motion sickness value may indicate a likelihood that a passenger may experience motion sickness from a particular portion of the route and a particular driving style. Using characteristics of each portion of each route, the sway, surge, and heave motion sickness values may be based determined. The sway motion sickness value may be determined based on a lateral acceleration, or rate of change in the lateral motion of a vehicle; the surge motion sickness value may be determined based on a fore-aft acceleration, or rate of change in the fore-aft motion of a vehicle; and the heave motion sickness value may be determined based on a vertical acceleration, or rate of change about the pitch axis of a vehicle.

The motion sickness values for each portion may be combined to determine a total motion sickness value for each driving style for each route of the set of routes. If there are three driving styles in the plurality of driving styles, each route may have three total motion sickness values. The total motion sickness value for each route for a given driving style may be, for example, a summation or an average of the motion sickness values for each portion for the given driving style.

A route and/or a driving style may be selected based on the total motion sickness value. A pairing of a route and a driving style may be selected for having a lower total motion sickness value than another pairing of a route and a driving style. When a given driving style is set as a preferred driving style, a long route with a total motion sickness dose value may be selected instead of a short route with a total motion sickness value higher than that of the long route. When a preference for shortest route is indicated, a shortest route with a less assertive driving style may be selected. When a passenger is determined to be prone to motion sickness, a route and driving style with a lowest total motion sickness value may be selected. Thereafter, an autonomous vehicle may be operated to navigate to the end location using the selected pairing of route and driving style.

In addition, as discussed in detail below, the features described herein allow for various alternatives.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format. Data 134 may include detailed map information 136, e.g., highly detailed maps identifying the characteristics of roadways, intersections, crosswalks, speed limits, traffic signals, buildings, signs, predicted and real-time traffic information, or other such objects and information. Characteristics of roadways may include shape (hills, curves, degrees of turns, etc.), elevation, and terrain. In some examples, the detailed map information may include predetermined virtual rails along which computing device 110 may maneuver vehicle 100. These rails may therefore be associated with direction information indicative of the direction of a lane (or direction traffic should move in that lane) in which the rail appears. By following the rails, vehicle 100's future locations along a route may be predicted with a high degree of accuracy.

In addition, data 134 of computing device 110 may store various control factor data. The control factors may include the availability of detailed map information (e.g. a road map vs. a highly detailed map of the location of lane lines, curbs, etc.) along the route, input from current data feeds (including, for example, traffic, construction, accident information, and weather data), data from other autonomous vehicles reporting problem areas, and historical data (including past traffic data, dangerous areas or areas of high accident rates, weather conditions such as fog, bright sunlight, etc.).

Data may also store a plurality of driving styles for operating vehicle 100. A driving style may represent a set of parameters at which a vehicle operates, such as speed and rate of acceleration. In other words, the driving style may represent how assertively a vehicle maneuvers. The more assertive the driving style, the higher rate of acceleration a passenger experiences. Therefore, assertive driving styles are more likely to cause a passenger to experience motion sickness. The plurality of driving styles may include a moderate driving style, an assertive driving style, and a cautious driving style. For the moderate driving style, a vehicle may operate slightly below posted speed limits, for example 5 to 10 miles per hour below posted speed limits, and may accelerate at a regular rate. For the assertive driving style, a vehicle may operate at posted speed limits and may accelerate at a faster rate than a vehicle operating at the moderate driving style. For the cautious driving style, a vehicle may operate at slower speeds, such as half the posted speed limits, and may accelerate at a slower rate than a vehicle operating at the moderate driving style.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing device 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing device 110 to provide information to passengers within the vehicle 100.

Computing device 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing device 110 may be an autonomous driving computing system incorporated into vehicle 100. The autonomous driving computing system may capable of communicating with various components of the vehicle. For example, returning to FIG. 1, computing device 110 may be in communication with various systems of vehicle 100, such as deceleration system 160, acceleration system 162, steering system 164, signaling system 166, navigation system 168, positioning system 170, and perception system 172, and protection system 174 in order to control the movement, speed, etc. of vehicle 100 in accordance with the instructions 132 of memory 130. Again, although these systems are shown as external to computing device 110, in actuality, these systems may also be incorporated into computing device 110, again as an autonomous driving computing system for controlling vehicle 100. As with the computing device 110, each of these systems may also include one or more processors as well as memory storing data and instructions as with processors 120, memory 130, instructions 132 and data 134.

As an example, computing device 110 may interact with deceleration system 160 and acceleration system 162 in order to control the speed of the vehicle. Similarly, steering system 164 may be used by computing device 110 in order to control the direction of vehicle 100. For example, if vehicle 100 is configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information.

Positioning system 170 may be used by computing device 110 in order to determine the vehicle's relative or absolute position on a map or on the earth. For example, the positioning system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing device 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by computing device 110. In the case where the vehicle is a small passenger vehicle such as a car, the car may include a laser 214 (shown in FIGS. 2A-2D) or other sensors mounted on the roof or other convenient location.

These sensors of perception system 172 may detect objects in the vehicle's environment as well as characteristics of those objects such as their location, heading, size (length height and width), type, and approximate center of gravity. For example, the perception system may use the height of an object identified as a pedestrian (or human) to estimate the approximate center of gravity of the object. In this regard, the perception system may compare the characteristics of the object to known anthropomorphic data to determine an approximate center of gravity. For other object types, the approximate center of gravity may be determined from the characteristics of the object using various known statistical analyses. Data and information required for these determinations may be stored, for example, in memory 130 or a different memory of the perception system.

The computing device 110 may control the direction and speed of the vehicle by controlling various components. By way of example, computing device 110 may navigate the vehicle to a destination location completely autonomously using data from the detailed map information and navigation system 168. Computing device 110 may use the positioning system 170 to determine the vehicle's location and perception system 172 to detect and respond to objects when needed to reach the location safely. In order to do so, computing device 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing device 110 may also control the drivetrain of the vehicle in order to maneuver the vehicle autonomously.

FIGS. 2A-2D are examples of external views of vehicle 100. As can be seen, vehicle 100 includes many features of a typical vehicle such as headlights 202, windshield 203, taillights/turn signal lights 204, rear windshield 205, doors 206, side view mirrors 208, tires and wheels 210, and turn signal/parking lights 212. Headlights 202, taillights/turn signal lights 204, and turn signal/parking lights 212 may be associated the signaling system 166. Light bar 207 may also be associated with the signaling system 166.

Figure 3:
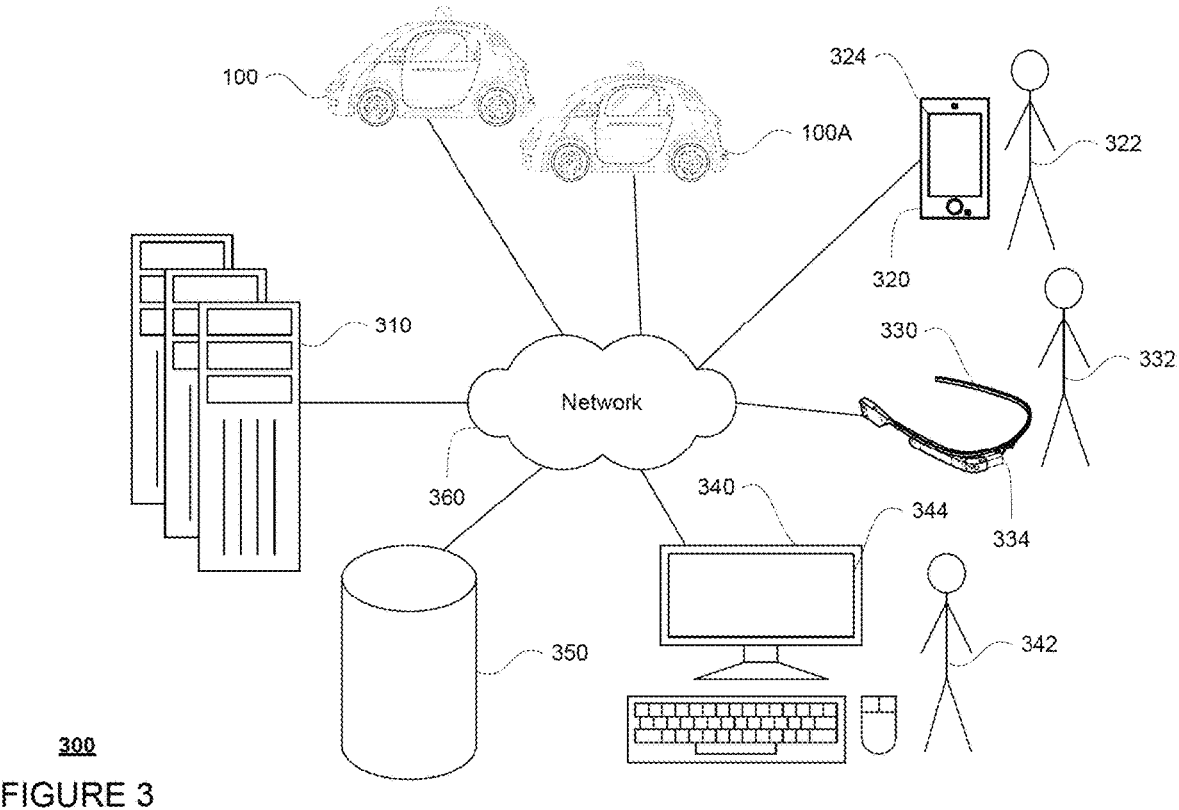
FIG. 3 is a functional diagram of an example system in accordance with an exemplary embodiment.
Figure 4:
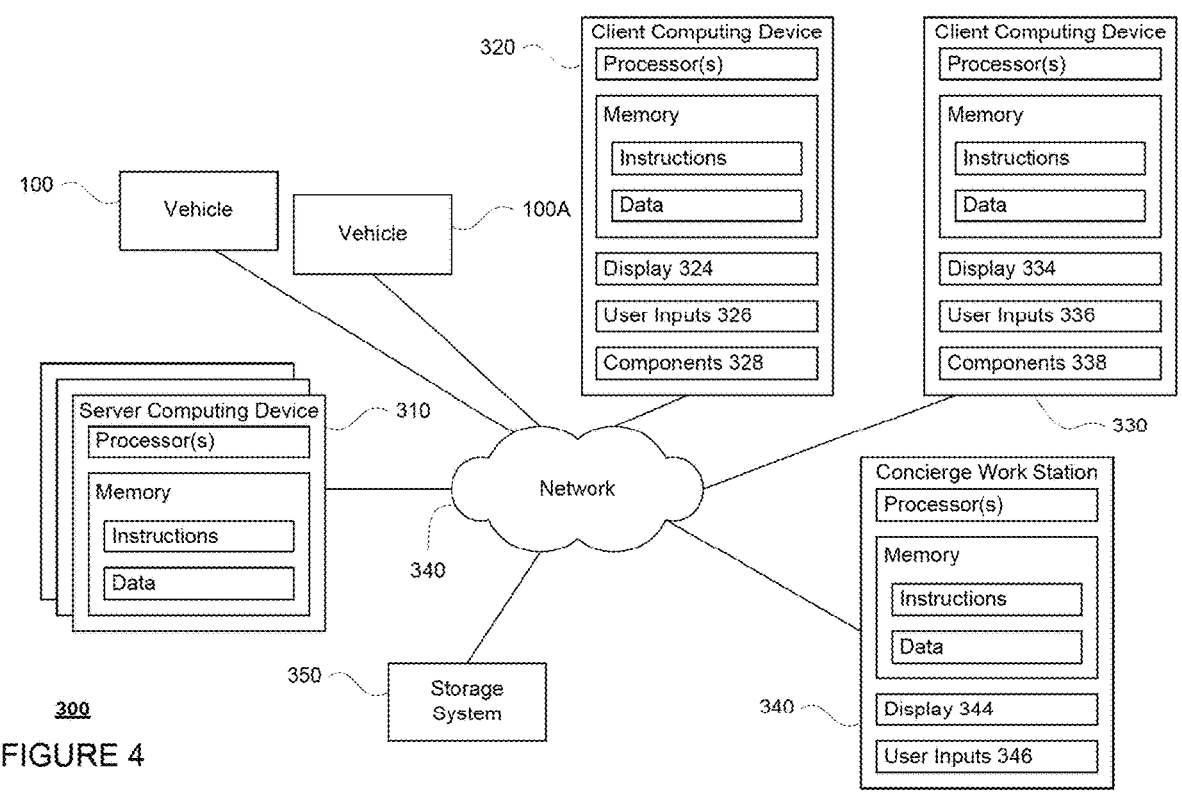
FIG. 4 is a pictorial diagram of the system of FIG. 3 in accordance with aspects of the disclosure.

Computing device 110 of vehicle 100 may also receive or transfer information to and from other computing devices. FIGS. 3 and 4 are pictorial and functional diagrams, respectively, of an example system 300 that includes a plurality of computing devices 310, 320, 330, 340 and a storage system 350 connected via a network 360. System 300 also includes vehicle 100, and vehicle 100A which may be configured similarly to vehicle 100. Although only a few vehicles and computing devices are depicted for simplicity, a typical system may include significantly more.

As shown in FIG. 4, each of computing devices 310, 320, 330, 340 may include one or more processors, memory, data and instructions. Such processors, memories, data and instructions may be configured similarly to one or more processors 120, memory 130, instructions 132, and data 134 of computing device 110.

The network 360, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 110 may include a server having a plurality of computing devices, e.g., a load balanced server farm, that exchange information with different nodes of a network for the purpose of receiving, processing and transmitting the data to and from other computing devices. These server computing devices may form part of a centralized dispatching system. For instance, one or more computing devices 310 may include one or more server computing devices that are capable of communicating with computing device 110 of vehicle 100 or a similar computing device of vehicle 100A as well as computing devices 320, 330, 340 via the network 360. For example, vehicles 100 and 100A may be a part of a fleet of vehicles that can be dispatched by server computing devices to various locations. In this regard, the vehicles of the fleet may periodically send the server computing devices location information provided by the vehicle's respective positioning systems and the one or more server computing devices may track the locations of the vehicles.

In addition, server computing devices 310 may use network 360 to transmit and present information to a user, such as user 322, 332, 342 on a display, such as displays 324, 334, 344 of computing devices 320, 330, 340. In this regard, computing devices 320, 330, 340 may be considered client computing devices.

As shown in FIG. 3, each client computing device 320, 330, 340 may be a personal computing device intended for use by a user 322, 332, 342, and have all of the components normally used in connection with a personal computing device including a one or more processors (e.g., a central processing unit (CPU)), memory (e.g., RAM and internal hard drives) storing data and instructions, a display such as displays 324, 334, 344 (e.g., a monitor having a screen, a touch-screen, a projector, a television, or other device that is operable to display information), and user input devices 326, 336, 346 (e.g., a mouse, keyboard, touch screen or microphone). The client computing devices may also include a camera for recording video streams, speakers, a network interface device, and all of the components used for connecting these elements to one another.

In addition, the client computing devices 320 and 330 may also include components 328 and 338 for determining the position and orientation of client computing devices. For example, these components may include a GPS receiver to determine the device's latitude, longitude and/or altitude as well as an accelerometer, gyroscope or another direction/speed detection device as described above with regard to positioning system 170 of vehicle 100.

Although the client computing devices 320, 330, and 340 may each comprise a full-sized personal computing device, they may alternatively comprise mobile computing devices capable of wirelessly exchanging data with a server over a network such as the Internet. By way of example only, client computing device 320 may be a mobile phone or a device such as a wireless-enabled PDA, a tablet PC, a wearable computing device or system, or a netbook that is capable of obtaining information via the Internet or other networks. In another example, client computing device 330 may be a wearable computing system, shown as a head-mounted computing system in FIG. 3. As an example the user may input information using a small keyboard, a keypad, microphone, using visual signals with a camera, or a touch screen.

In some examples, client computing device 340 may be a concierge work station used by an administrator to provide concierge services to users such as users 322 and 332. For example, a concierge 342 may use the concierge work station 340 to communicate via a telephone call or audio connection with users through their respective client computing devices or vehicles 100 or 100A in order to facilitate the safe operation of vehicles 100 and 100A and the safety of the users as described in further detail below. Although only a single concierge work station 340 is shown in FIGS. 3 and 4, any number of such work stations may be included in a typical system.

Storage system 350 may store various types of information as described in more detail below. This information may be retrieved or otherwise accessed by a server computing device, such as one or more server computing devices 310, in order to perform some or all of the features described herein. For example, the information may include user account information such as credentials (e.g., a user name and password as in the case of a traditional single-factor authentication as well as other types of credentials typically used in multi-factor authentications such as random identifiers, biometrics, etc.) that can be used to identify a user to the one or more server computing devices. The user account information may also include personal information such as the user's name, contact information, identifying information of the user's client computing device (or devices if multiple devices are used with the same user account), as well as one or more unique signals for the user.

The storage system 350 may also store routing data for generating and evaluating routes between locations. For example, the routing information may be used to estimate how long it would take a vehicle at a first location to reach a second location. In this regard, the routing information may include map information, not necessarily as particular as the detailed map information described above, but including roads, as well as information about those roads such as direction (one way, two way, etc.), orientation (North, South, etc.), speed limits, as well as traffic information identifying expected traffic conditions, etc. The storage system 350 may also include detailed map information similar in nature to the detailed map information 136, various control factor data, and driving styles for operating autonomous vehicles.

As with memory 130, storage system 350 can be of any type of computerized storage capable of storing information accessible by the server computing devices 310, such as a hard-drive, memory card, ROM, RAM, DVD, CD-ROM, write-capable, and read-only memories. In addition, storage system 350 may include a distributed storage system where data is stored on a plurality of different storage devices which may be physically located at the same or different geographic locations. Storage system 350 may be connected to the computing devices via the network 360 as shown in FIG. 3 and/or may be directly connected to or incorporated into any of the computing devices 110, 310, 320, 330, 340, etc.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 5:
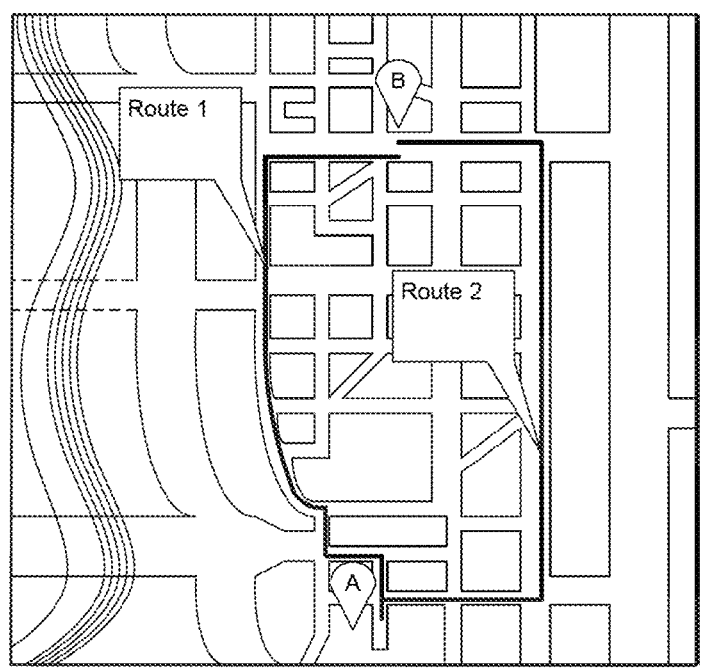
FIG. 5 is an example map in accordance with aspects of the disclosure.

To determine a route and driving style for a trip in an autonomous vehicle, one or more routes from a start location to an end location may be determined. Known routing techniques utilizing a road network map, such as map information stored in memory 130 or storage system 350, may be used to identify a set of routes between the start location and end location. In this regard, the routing may consider various factors such as timing, distance, terrain, type of street, traffic control systems, traffic congestion, and speed limit. The set of routes may be fairly small, such as the five (5) shortest (in time and/or distance), or somewhat large, such as the 100 shortest (in time and/or distance). The start location may be a detected current location of a user device, such as client computing device 320 or 330, or may be selected based on user input received from the user device. The end location may be selected based on user input received from the user device. As shown in FIG. 5, two (2) routes between start location A and destination location B, Route 1 and Route 2, are determined to be the two shortest routes using map information 500. Route 1 has a distance of 10.1 miles long, and Route 2 has as distance of 10.3 miles long.

Each route of the set of routes may comprise one or more portions. For example, a first portion of the route may be a distance on a first street of the map, a second portion of the route may be a turn on the route from the first street of the map and a second street of the map, and a third portion of the route may be a distance on the second street of the map. The first portion of the route may be between the start location and a first point on the route, the second portion between the first point and a second point on the route, and the third portion between the second point on the route and the destination. As shown in diagram 600 of FIG. 6, Route 2 comprises turn portion P1, street portion P2, turn portion P3, street portion P4, turn portion P5, and street portion P6.

Figure 7:
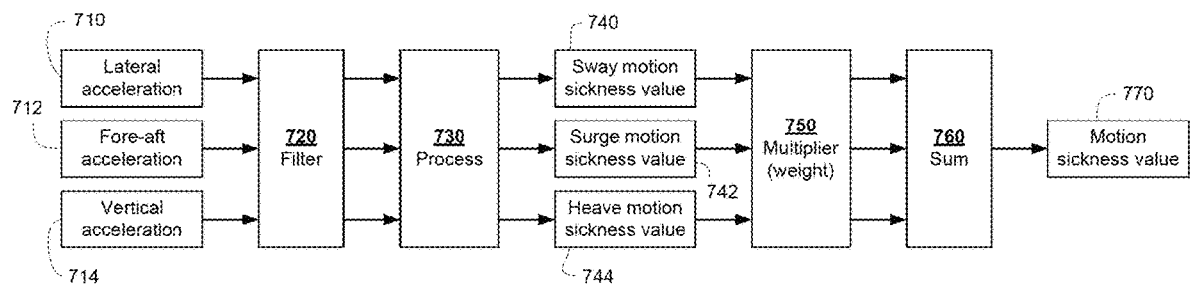
FIG. 7 is an example flow diagram for determining a motion sickness value for a portion of a route in accordance with aspects of the disclosure.

FIG. 7 is a flow diagram 700 showing how a motion sickness value for a given portion of a route for a given driving style may be determined. Each portion of each route of the set of routes may be assigned a motion sickness value indicating a likelihood that a passenger may experience motion sickness by combining one or more of a sway motion sickness value, a surge motion sickness value, or a heave motion sickness value of each portion of the route for each driving style in a plurality of driving styles.

Predicted accelerations along the given portion of the route may be determined using a given driving style, historical data, and detailed map information. Regarding driving style, predicted accelerations may be greater for an assertive driving style than for a moderate driving style because a vehicle travels at faster speeds and quicker accelerations when using the assertive driving style than the moderate driving style. The predicted accelerations may be even less for a cautious driving style since a vehicle travels at even lower speeds and slower accelerations when using the cautious driving style.

Historical data may include historical traffic information. If historical traffic indicates that a stretch of roadway has had stop-and-go traffic due to congestion, higher amounts of fore-aft acceleration may be predicted.

Characteristics of roadways from detailed map information 136, such as amount of curves, turns, hills, intersections, stop signs, and traffic lights, may also inform the determination of predicted accelerations. A vehicle may experience higher amounts of lateral acceleration on curves or turns. A vehicle may experience higher amounts of fore-aft acceleration due to stops and starts, such as at stop signs or traffic lights along the roadway. Thus, predicted accelerations may include accelerations in different directions, such as lateral acceleration 710, fore-aft acceleration 712, and vertical acceleration 714 as shown in FIG. 7. As discussed in further detail below, predicted accelerations may be used to determine sway, surge, and heave motion sickness values as discussed further below.

Returning to FIG. 6, such as turn portions P1, P3, and P5 of Route 2. For example, street portion P4 of Route 2 includes five intersections, which increases the predicted amount of fore-aft acceleration for street portion P4.

The lateral, fore-aft, and vertical accelerations for the given portion of the route may be passed through one or more filters related to motion sickness. The one or more filters 720 may be configured to remove accelerations to which humans are not sensitive and keep those to which humans are sensitive. For different types of acceleration, a different filter may be used. The input lateral, fore-aft, and vertical accelerations may therefore have a wider range of accelerations than filtered lateral, fore-aft, and vertical accelerations.

The filtered lateral, fore-aft, and vertical accelerations may be processed to determine sway, surge, and heave motion sickness values for the given portion of the route. For each of the filtered lateral, fore-aft, and vertical accelerations input at 730, and a sway motion sickness value 740, surge motion sickness value 742, and heave motion sickness value 744 are output. As an example, the sway motional sickness value may be calculated by taking a square root of the integral of the squared lateral acceleration, and the surge motion sickness value by taking a square root of the integral of the squared fore-aft acceleration, and the heave motion sickness value by taking a square root of the integral of the squared vertical acceleration. Of course, other calculations may also be used to determine these values.

The sway, surge, and heave motion sickness values for each driving style may be aggregated in a weighted manner to determine the motion sickness value for the given portion of the route. A multiplier 750, or weight, is applied to each of the sway 740, surge 742, or heave 744 motion sickness values. Each multiplier may be specific to the type of motion sickness value. In other words, the multiplier applied to the sway motion sickness value 740 may differ from the multiplier applied to the surge motion sickness value 742, which may differ from the multiplier applied to the heave motion sickness value 744. In some instances, the lateral motion sickness value may be weighted more than the fore-aft and heave motion sickness values as changes in lateral movement may be more likely to induce motion sickness in a passenger. In this regard, as an example, the sway, surge, and heave motion sickness values may be weighted with weights of 0.67, 0.22, and 0.11, respectively.

The weighted sway, surge, and heave motion sickness values for the given portion of the route may be summed at block 760 to determine the motion sickness value 770 for the given portion. For Route 2, motion sickness value for turn portion P1 is determined by a sum of the sway motion sickness value for P1, the surge motion sickness value for P1, and the heave motion sickness value for P1. The sway motion sickness value for P1 using the moderate driving style may be 0.5, for example. The surge motion sickness value for P1 using the moderate driving style may be 0.3. The heave motion sickness value for P1 using the moderate driving style may be 0.1. Using the weights of 0.67, 0.22, and 0.11 for sway, surge, and heave motion sickness values, respectively, the motion sickness value for P1 may be 0.67*0.5+0.22*0.25+0.11*0.1, which is 0.40. Motion sickness values for portions P2-P6 may be similarly calculated using the sway, surge, and heave motion sickness values specific to the respective portions of Route 2.

The motion sickness values for each portion may be combined to determine a total motion sickness value for each driving style for each route of the set of routes. If there are three driving styles in the plurality of driving styles, each route may have three total motion sickness values. The total motion sickness value for each route for a given driving style may be, for example, a summation, an average, or a weighted combination of the motion sickness values for the portions of a route for the given driving style. The weights for the weighted combination may be relative to a ratio of a length of each portion and an overall length of the route. Thus, if the set of routes were to include 5 different routes and there are 3 different driving styles, the result would be 15 (5×3) total motion sickness values.

Figure 6:
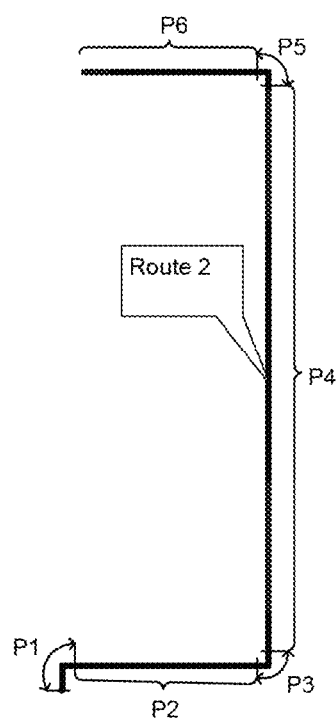
FIG. 6 is an example route in accordance with aspects of the disclosure.

Returning to the Example of FIG. 6, for Route 2, motion sickness values for portions P1-P6 for the moderate driving style may be combined to determine the total motion sickness value for the moderate driving style for Route 2. For the moderate driving style, motion sickness values for P1-P6 may be 0.40, 0.15, 0.40, 0.30, 0.40, and 0.15, respectively. These total motion sickness value for the moderate driving style for Route 2 may therefore be an average of P1-P6 motion sickness values: 0.3. Motion sickness values for portions P1-P6 for the assertive driving style may also be averaged to determine the total motion sickness value for the assertive driving style for Route 2, and values for the cautious driving style to determine the total motion sickness value for the cautious driving style. The total motion sickness value for Route 1 for the assertive, moderate, and cautious driving styles may be similarly determined. Similar determinations may be made for Route 1 regarding each of the driving styles.

Therefore, for Routes 1 and 2 and for three driving styles, a total of six (6) total motion sickness values may be determined. According to routing option 810 in FIG. 8, taking Route 1 is predicted to have a travel time of 29 minutes and a motion sickness value of 0.8 for the assertive driving style, 31 minutes travel time and 0.5 motion sickness value for the moderate driving style, and 33 minutes travel time and 0.2 motion sickness value for the cautious driving style. Routing option 820 shows that taking Route 2, on the other hand, is predicted to have a travel time of 32 minutes and a motion sickness value of 0.4 for the assertive driving style, 35 minutes travel time and 0.3 motion sickness value for the moderate driving style, and 37 minutes travel time and 0.1 motion sickness value for the cautious driving style.

A route and/or a driving style may be selected based on the total motion sickness value. A pairing of a route and a driving style may be selected for having a lower total motion sickness value than another pairing of a route and a driving style. A given driving style may be set as a preferred driving style. When a given driving style is set as a preferred driving style, such as the moderate driving style, a long route with a total motion sickness dose value may be selected instead of a short route with a total motion sickness value higher than that of the long route. A passenger may indicate a preference for a shortest route, in which case a shortest route with a less assertive driving style may be selected. If a passenger is prone to motion sickness, a route and driving style with a lowest total motion sickness value may be selected. A passenger's susceptibility to motion sickness may be determined using an evaluation of the passenger comprising a series of questions. The evaluation may additionally or alternatively include detecting a passenger's characteristics that may be related to susceptibility to motion sickness, such as age, gender, and ethnicity, using vision techniques.

Figure 8:
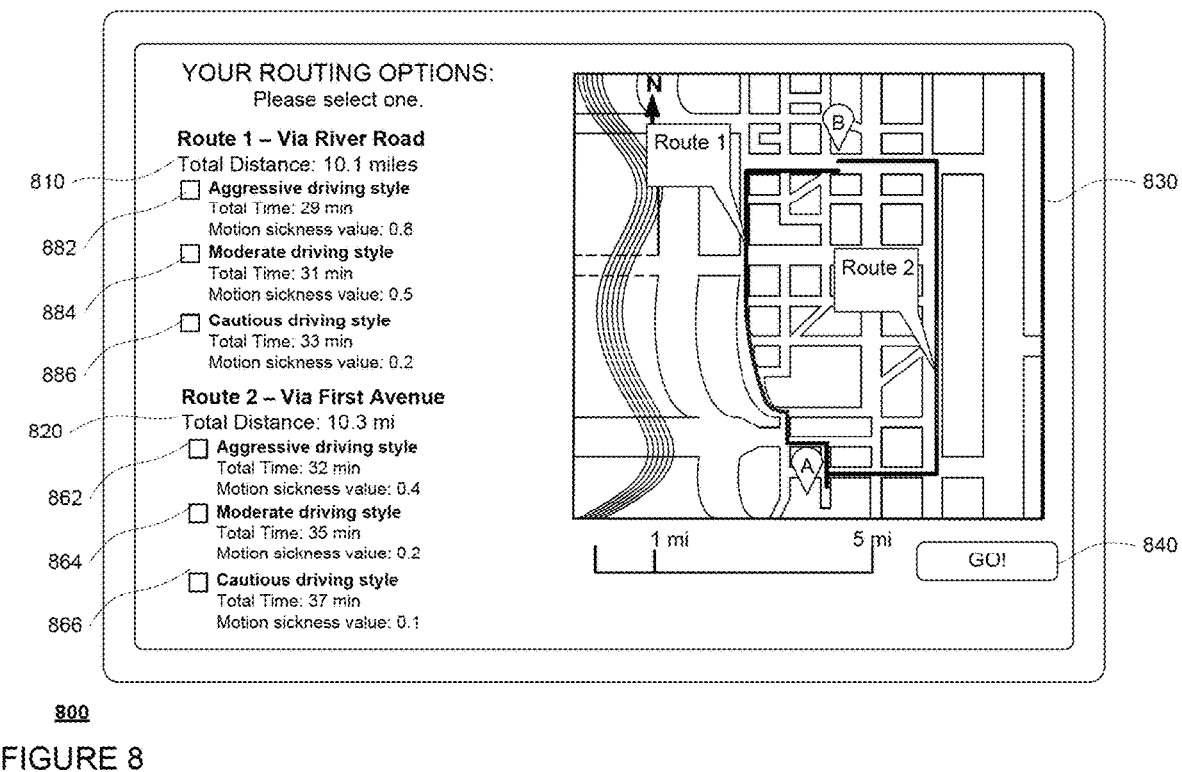
FIG. 8 is an example display in accordance with aspects of the disclosure.

For the routing options shown in FIG. 8, if a moderate driving style is set as the preferred driving style, Route 2 may be selected since the total motion sickness value for the moderate driving style on Route 2 is 0.3, which is lower than the total motion sickness value for the moderate driving style on Route 1, 0.5. Because Route 1 is shorter than Route 2, Route 1 and the cautious driving style may be selected when the shortest route is indicated as a user preference. In the situation where a passenger is determined to be prone to motion sickness, Route 2 and the cautious driving style may be selected since this combination yields the lowest motion sickness value, 0.1.

Thereafter, an autonomous vehicle may be operated to navigate to the end location using the selected route and driving style as described above.

Figure 9:
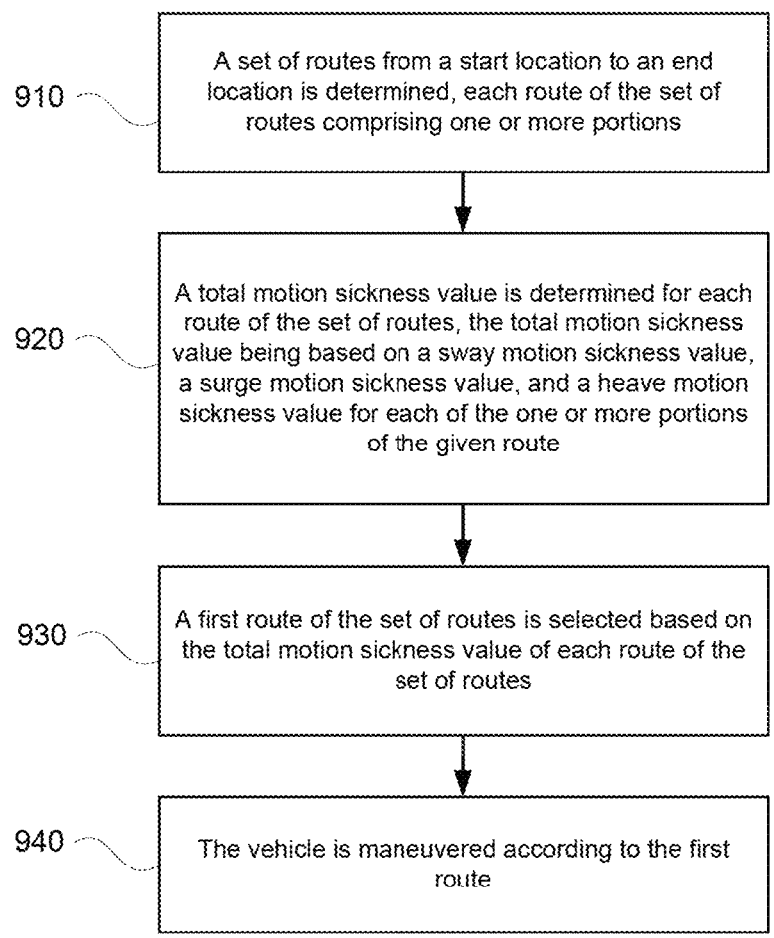
FIG. 9 is another example flow diagram for determining a route and a driving style in accordance with aspects of the disclosure.

FIG. 9 is an example flow diagram 900 including a method for operating a vehicle for passenger comfort, in accordance with some of the aspects described above. For example, at block 910, a set of routes from a start location to an end location may be determined. Each route of the set of routes may comprise one or more portions. The one or more portions of a given route may correspond to different sections of the route, such as streets and turns.

At block 920, a total motion sickness value may be determined for each route of the set of routes. The total motion sickness value may be determined based on motion sickness values for each of the one or more portions of a given route. The motion sickness values for a given portion including a sway motion sickness value, a surge motion sickness value, and a heave motion sickness value. The motion sickness values for each portion of the given route may be aggregated in order to determine the total motion sickness value of the given route.

At block 930, a first route of the set of routes is selected based on the total motion sickness value of each route of the set of routes. The first route may be selected for being, by way of example, the route with the lowest total motion sickness value, the fastest route with the highest total motion sickness value not exceeding a threshold value, or the shortest route with the lowest total motion sickness value. Then, at block 940, a vehicle may be maneuvered autonomously according to the selected first route.

In further examples, the selected route and driving style may be changed in real-time based upon updated route characteristics and/or a passenger's input. Updated route characteristics may include, for example, actual traffic congestion and patterns detected while the vehicle is in route to the destination. Actual motion sickness values for a portion of a route may therefore be higher than the determined motion sickness values for the portion of the route due to the updated route characteristics. In situations where the actual motion sickness value is higher, the autonomous vehicle may automatically start operating using a less assertive driving style and/or take a different route in order to achieve a lower actual motion sickness value and/or to match the determined total motion sickness value for the route overall. In some examples, the autonomous vehicle may operate at a longer following distance from a preceding vehicle if the higher actual motion sickness value is due to a traffic pattern comprising many quick stops. Alternatively, the autonomous vehicle may automatically change the route to use a less congested street.

Input from a passenger may be a selection of different route and/or driving style. Input may also be an indication that a passenger is experiencing symptoms of motion sickness. For example, a passenger may provide vocal input that they "feel sick," or a passenger's physical reactions may be detected visually to determine that he or she is close to or is currently feeling sick. When an indication that a passenger is experiencing symptoms of motion sickness is received, the autonomous vehicle may automatically start operating using a less assertive driving style. In some examples, the autonomous vehicle may operate at a slower speed.

Selection of a route and/or driving style may also be based on a threshold value for the total motion sickness value of a route. The total motion sickness values for each route of the set of routes may be compared with a threshold value. A lower threshold value may be set when a passenger is prone to motion sickness, either based on natural sensitivities or temporary sensitivities. A temporary sensitivity may be an illness that causes nausea. On the other hand, a higher threshold value may be set when a passenger is less prone to motion sickness. The threshold value may be a default number. The default number may represent when a passenger more likely than not would experience motion sickness on the route. Alternatively, the threshold value may be set by a passenger or may be determined based on the evaluation of a passenger. The evaluation of the passenger may comprise collecting feedback from the passenger during and/or after a trip. Feedback may include a rating of how comfortable the ride was, or a level of comfort, and may be averaged over time to determine a custom threshold value for the passenger. Each time feedback is received from the passenger, the threshold value may be updated. Routing options with total motion sickness values greater than the threshold value may be removed from consideration during selection. For example, if a threshold value for the total motion sickness values is set at 0.5, the assertive driving style for Route 1 may be removed from consideration during selection.

When there are more than one passenger in the vehicle, selection of the route and/or driving style may be based on a threshold value for the passenger most prone to motion sickness.

A threshold value for a portion of a route may also be used to determine a driving style for each portion of a route. The threshold value for a portion of a route may be different from the threshold value for the total motion sickness value. In some implementations, a driving style may be selected for each portion of each route individually rather than for a whole route. For each portion of each route, therefore, a driving style may be selected such that the motion sickness value of a given portion does not exceed a set threshold value. For Route 2, for example, the cautious driving style may be selected for P1, while the assertive driving style may be selected for P2. In other examples, driving styles may be determined for each portion of a route such that the total motion sickness value does not exceed a set threshold value for the total motion sickness value.

A threshold value for the total motion sickness value of a route or for a portion of a route may be used to change the selected route and the driving style in real-time. Before a trip, a selected route and driving style may be selected for a route such that the total motion sickness value is less than the threshold value for the total motion sickness value of a route. During the trip, actual motion sickness values along a portion of the route may be detected to be greater than the determined motion sickness values along the portion of the route. As a result, the actual total motion sickness value for the route overall may be determined to exceed the threshold value if the remaining portions of the selected route is executed with the selected driving style. In response, the selected route and the driving style may be changed in real-time as described above. Alternatively, the selected route and driving style may be changed in real-time when actual motion sickness values for a given portion of the route exceeds the determined motion sickness value for the given portion.

The total motion sickness values for the one or more routes for each of the plurality of driving styles may be provided for display. In particular, the driving styles for each route that are under consideration for selection may be displayed. The display 800 of FIG. 8 may be rendered by computing device 110 on a display in vehicle 100 or by a client computing device 320 or 330 on display 324 or 334. As shown, the display 800 includes routing options 810 and 820 for Route 1 and Route 2, respectively, and a map 830 depicting Route 1 and Route 2. Each routing option includes driving style information 882, 884, 886, 862, 864, and 866. In other examples, a recommended pairing of route and driving style may be provided as well.

Selection of the route and/or driving style may also be based on user input received at the user device. In the example display 800, the displayed driving style options, 882, 884, 886, 862, 864, 866 may be a subset of driving style options selected for display based on the corresponding motion sickness value for each driving style. Each driving style option for each route includes a selection button to receive user input. User input may be received at one of the selection buttons indicating a route and driving style pairing. Selection button 840 also is included in the display 800 to receive user input to start operation of the vehicle according to the selected route and driving style pairing.

In another alternative, a custom driving style may be determined for a user based on the user's input. The user's input may include data collected from a user when the user is driving a vehicle, such as speed and acceleration. The custom driving style may be set as the default driving style, and a route may be selected from a plurality of routes based on the default driving style and a motion sickness value.

Motion sickness values for each portion of each route may additionally be based on roll acceleration, yaw acceleration, and pitch acceleration, for example. The roll motion sickness value may be determined based on a roll acceleration, or rate of change about the roll axis of a vehicle. The yaw motion sickness value may be determined based on a yaw acceleration, or rate of change about the yaw axis of a vehicle. The pitch motion sickness value may be determined based on a pitch acceleration, or rate of change about the pitch axis of a vehicle. In some examples, the roll motional sickness value may be calculated by taking a square root of the rate of change of the roll acceleration, and the yaw motion sickness value by taking a square root of the rate of change of the yaw acceleration, and the pitch motion sickness value by taking a square root of the rate of change of the pitch acceleration.

Further, motion sickness values for each portion of each route may be based on a seat location in a vehicle. A trajectory of a seat and the accelerations on the seat differs depending on the location of the seat in the vehicle. For example, a seat near the front of a vehicle may experience less acceleration, such as 10% less sway, or lateral, acceleration, than a seat near the back of the vehicle. Motion sickness values may be determined for each seat location. Based on the determined motion sickness values for each seat, a recommendation for a seat location for a passenger may be provided. The recommendation may also take into consideration passenger preferences and/or threshold values. Real-time changes to a route and a driving style may be based on the seat location of the seat in which a passenger is.

In-vehicle entertainment options may be tailored based on the determined motion sickness values for each portion of the route. For example, on portions of routes with higher motion sickness values or motion sickness values above a set threshold, a screen that a passenger is looking at may be positioned so that the passing scenery is in the passenger's field of view. In other examples, an alert may be played or sent to the passenger to encourage the passenger to avoid looking down and/or reading.

The features described above may provide for a system for determining a route and a driving style for a vehicle for passenger comfort during navigation. By taking into account a vehicle's accelerations and a likelihood of motion sickness, an autonomous vehicle may be operated in a manner to prevent or lessen motion sickness. Passengers may more easily engage in other activities like conversation, eating, drinking, reading, working on laptops/tablets, etc. In addition, passengers may easily control the vehicle to obtain a smoother, more relaxed ride or, in other cases, choose a quicker, more time-efficient ride. Passengers may be more likely take repeated trips in an autonomous vehicle or recommend riding in the autonomous vehicle. Trips in the vehicle may have fewer stops or other interruptions due to passenger discomfort. In addition, passengers may be less likely to become sick in the vehicles. As a result, there may be a smaller likelihood of having to clean up after a sick person in the vehicle.

Although the examples described herein are related to the use of vehicles when operating in autonomous driving modes, such features may also be useful for vehicles operating in manual or semi-autonomous modes or for vehicles having only manual driving mode and semi-autonomous driving modes.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:
   determining, by one or more computing devices, a set of routes for a vehicle to an end location;
   for each given route of the set of routes, determining, by the one or more computing devices, a total motion sickness value based on one or more predicted accelerations of the vehicle operating in a first driving style, wherein the total motion sickness value for a route reflects a likelihood that a user will experience motion sickness while in the vehicle along the route;
   selecting, by the one or more computing devices, a first route of the set of routes based on the total motion sickness value of each route of the set of routes; and
   operating, by the one or more computing devices, the vehicle according to the first route in the first driving style.

2. The method of claim 1, further comprising:
   determining, by the one or more computing devices, a user is experiencing symptoms of motion sickness while the vehicle is operating using the first driving style based on user input, user characteristics, or route characteristics; and
   operating, by the one or more computing devices, the vehicle using a second driving style, the second driving style being less assertive than the first driving style.

3. The method of claim 2, wherein determining the user is experiencing symptoms of motion sickness while the vehicle is operating using the first driving style based on route characteristics includes:
   determining an updated total motion sickness value based on updated route characteristics; and
   determining that the updated total motion sickness value is higher than the determined total motion sickness value.

4. The method of claim 2, wherein determining the user is experiencing symptoms of motion sickness while the vehicle is operating using the first driving style based on route characteristics includes:
   determining an updated total motion sickness value based on updated route characteristics; and
   determining that the updated total motion sickness value is higher than a threshold value for a total motion sickness value.

5. The method of claim 2, wherein the user input includes vocal input from the user.

6. The method of claim 2, further comprising detecting, using one or more sensors, physical reactions of the user that indicates that the user is experiencing or is likely to experience symptoms of motion sickness while the vehicle is operating using the first driving style.

7. The method of claim 1, wherein the total motion sickness value for each route is further based on a location of a seat in the vehicle.

8. The method of claim 1, wherein selecting the first route of the set of routes based on the total motion sickness value of each route of the set of routes includes comparing each total motion sickness value to a threshold value.

9. The method of claim 1, wherein determining the total motion sickness value includes determining a sway motion sickness value, a surge motion sickness value, and a heave motion sickness value based on the first driving style; and
   wherein the total motion sickness value is based on the sway motion sickness value, the surge motion sickness value, and the heave motion sickness value.

10. The method of claim 9, wherein determining the total motion sickness value further includes determining a roll motion sickness value, a yaw motion sickness value, and a pitch motion sickness value based on the first driving style; and wherein the total motion sickness value is further based on the roll motion sickness value, the yaw motion sickness value, and the pitch motion sickness value.

11. A system comprising:
a memory storing instructions for operating a vehicle autonomously; and
one or more computing devices configured to:
determine a set of routes for the vehicle to an end location;
for each given route of the set of routes, determine a total motion sickness value based on one or more predicted accelerations of the vehicle operating in a first driving style, wherein the total motion sickness value for a route reflects a likelihood that a user will experience motion sickness while in the vehicle along the route;
select a first route of the set of routes based on the total motion sickness value of each route of the set of routes; and
operate the vehicle according to the first route in the first driving style.

12. The system of claim 11, wherein the one or more computing devices are further configured to:
determine a user is experiencing symptoms of motion sickness while the vehicle is operating using the first driving style based on user input, user characteristics, or route characteristics; and
operate the vehicle using a second driving style, the second driving style being less assertive than the first driving style.

13. The system of claim 12, wherein the one or more computing devices are configured to determine the user is experiencing symptoms of motion sickness while the vehicle is operating using the first driving style based on:
an updated total motion sickness value determined based on updated route characteristics; and
the updated total motion sickness value being higher than the determined total motion sickness value.

14. The system of claim 12, wherein the one or more computing devices are configured to determine the user is experiencing symptoms of motion sickness while the vehicle is operating using the first driving style based on:
an updated total motion sickness value based on based on updated route characteristics; and
the updated total motion sickness value being higher than a threshold value for a total motion sickness value.

15. The system of claim 12, wherein the one or more computing devices are further configured to detect, using one or more sensors, physical reactions of the user that indicates that the user is experiencing or is likely to experience symptoms of motion sickness while the vehicle is operating using the first driving style.

16. The system of claim 11, wherein the one or more computing devices are configured to determine the total motion sickness value based on a sway motion sickness value, a surge motion sickness value, and a heave motion sickness value based on the first driving style.

17. The system of claim 16, wherein the one or more computing devices are configured to determine the total motion sickness value further based on a roll motion sickness value, a yaw motion sickness value, and a pitch motion sickness value based on the first driving style.

18. The system of claim 11, further comprising the vehicle.

19. A non-transitory, tangible computer-readable storage medium on which computer readable instructions of a program are stored, the computer readable instructions, when executed by one or more computing devices, cause the one or more computing devices to perform a method, the method comprising:
determining a set of routes for a vehicle to an end location;
for each given route of the set of routes, determining a total motion sickness value based on one or more predicted accelerations of the vehicle operating in a first driving style, wherein the total motion sickness value for a route reflects a likelihood that a user will experience motion sickness while in the vehicle along the route;
selecting a first route of the set of routes based on the total motion sickness value of each route of the set of routes; and
operating the vehicle according to the first route in the first driving style.

20. The medium of claim 19, wherein the method further comprises:
determining a user is experiencing symptoms of motion sickness while the vehicle is operating using the first driving style based on user input, user characteristics, or route characteristics; and
operating the vehicle using a second driving style, the second driving style being less assertive than the first driving style.

* * * * *